United States Patent
Nguyen et al.

(10) Patent No.: US 11,268,367 B2
(45) Date of Patent: Mar. 8, 2022

(54) FRACTURING A WELLBORE WITH ENHANCED TREATMENT FLUID PLACEMENT IN A SUBTERRANEAN FORMATION

(71) Applicant: Halliburton Energy Services, Inc., Houston, TX (US)

(72) Inventors: Philip D. Nguyen, Houston, TX (US); Ronald Glen Dusterhoft, Katy, TX (US); Antonio Recio, III, Humble, TX (US); Golchehreh Salamat, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/641,016

(22) PCT Filed: Dec. 31, 2019

(86) PCT No.: PCT/US2019/069039
§ 371 (c)(1),
(2) Date: Feb. 21, 2020

(87) PCT Pub. No.: WO2020/197607
PCT Pub. Date: Oct. 1, 2020

(65) Prior Publication Data
US 2021/0140296 A1    May 13, 2021

Related U.S. Application Data (60) Provisional application No. 62/824,859, filed on Mar. 27, 2019.

(51) Int. Cl.
*E21B 43/27*    (2006.01)
*E21B 43/26*    (2006.01)
(Continued)

(52) U.S. Cl.
CPC .............. *E21B 43/27* (2020.05); *C09K 8/524* (2013.01); *C09K 8/54* (2013.01); *C09K 8/74* (2013.01);
(Continued)

(58) Field of Classification Search
CPC ..... E21B 43/27; E21B 43/2607; C09K 8/524; C09K 8/54; C09K 8/74; C09K 8/80;
(Continued)

(56) References Cited

U.S. PATENT DOCUMENTS 4,716,967 A * 1/1988 Mohaupt ............... E21B 43/263
166/299
4,903,772 A    2/1990 Johnson
(Continued)

FOREIGN PATENT DOCUMENTS

WO    2015159304    10/2015
WO    2017075139    5/2017
(Continued)

OTHER PUBLICATIONS

PCT/US2019/069039, "International Search Report and Written Opinion", dated Apr. 28, 2020, 11 pages.
(Continued)

*Primary Examiner* — Silvana C Runyan
(74) *Attorney, Agent, or Firm* — Kilpatrick Townsend & Stockton LLP (57) ABSTRACT

Energy created by a propellant can form a fracture in a subterranean formation. For example, a treatment fluid can be introduced into a subterranean formation. A propellant can be positioned in the subterranean formation. The propellant can be detonated to generate a fracture in the subterranean formation for receiving at least part of the treatment fluid. The treatment fluid may include an acid, a hydrolysable in-situ acid generator, a chelating agent, a
(Continued)

hydrolysable in-situ chelating agent generator, or mixtures thereof.

20 Claims, 4 Drawing Sheets

(51) Int. Cl.
*C09K 8/524* (2006.01)
*C09K 8/54* (2006.01)
*C09K 8/74* (2006.01)
*C09K 8/80* (2006.01)

(52) U.S. Cl.
CPC ............ C09K 8/80 (2013.01); E21B 43/2607 (2020.05); *C09K 2208/04* (2013.01); *C09K 2208/10* (2013.01); *C09K 2208/22* (2013.01); *C09K 2208/28* (2013.01); *C09K 2208/32* (2013.01)

(58) Field of Classification Search
CPC ............ C09K 2208/04; C09K 2208/22; C09K 2208/28; C09K 2208/32
See application file for complete search history.

(56) References Cited

U.S. PATENT DOCUMENTS

| | | | |
|---|---|---|---|
| 5,355,802 A | 10/1994 | Petitjean | |
| 7,228,906 B2 | 6/2007 | Snider et al. | |
| 7,353,866 B2 | 4/2008 | Snider et al. | |
| 7,431,075 B2 | 10/2008 | Brooks et al. | |
| 7,565,930 B2 * | 7/2009 | Seekford | E21B 43/263 |
| | | | 166/297 |
| 7,571,768 B2 | 8/2009 | Cuthill | |
| 7,950,457 B2 | 5/2011 | Seekford | |
| 8,469,110 B2 | 6/2013 | Sanders et al. | |
| 8,522,863 B2 | 9/2013 | Tiernan et al. | |
| 8,607,704 B2 | 12/2013 | Stark et al. | |
| 8,689,876 B2 | 4/2014 | Loree et al. | |
| 9,027,641 B2 | 5/2015 | Alekseenko et al. | |
| 9,062,545 B2 | 6/2015 | Roberts et al. | |
| 9,182,207 B2 | 11/2015 | Mcpherson et al. | |
| 9,447,672 B2 | 9/2016 | Arrell, Jr. et al. | |
| 9,453,402 B1 | 9/2016 | Barton et al. | |
| 9,470,079 B1 | 10/2016 | Schmidt et al. | |
| 9,689,247 B2 | 6/2017 | Holder et al. | |
| 9,896,920 B2 | 2/2018 | Holder | |
| 9,995,124 B2 | 6/2018 | Moore et al. | |
| 2004/0040707 A1* | 3/2004 | Dusterhoft | E21B 43/267 |
| | | | 166/279 |
| 2004/0152601 A1* | 8/2004 | Still | C09K 8/06 |
| | | | 507/100 |
| 2007/0163775 A1 | 7/2007 | Walton et al. | |
| 2009/0114382 A1* | 5/2009 | Grove | E21B 43/119 |
| | | | 166/63 |
| 2010/0044047 A1 | 2/2010 | Kabishcher et al. | |
| 2016/0061017 A1* | 3/2016 | Nguyen | C09K 8/66 |
| | | | 166/280.2 |
| 2016/0122625 A1* | 5/2016 | Singh | C09K 8/706 |
| | | | 166/307 |
| 2017/0204713 A1 | 7/2017 | Bell et al. | |
| 2017/0234116 A1 | 8/2017 | Gilliat et al. | |
| 2018/0238160 A1* | 8/2018 | Nguyen | C09K 8/80 |
| 2019/0153845 A1* | 5/2019 | Hunter | E21B 43/248 |

FOREIGN PATENT DOCUMENTS

| | | |
|---|---|---|
| WO | 2018080500 | 5/2018 |
| WO | 2018080503 | 5/2018 |
| WO | 2018136095 | 7/2018 |
| WO | 2019027470 | 2/2019 |

OTHER PUBLICATIONS

Barree et al., "The Limits of Fluid Flow in Propped Fractures—the Disparity Between Effective Flowing and Created Fracture Lengths", Society of Petroleum Engineers (SPE-194355_MS), Feb. 2019, 27 pages.
Halliburton Energy Services, Inc., "StimGun System Technology", available online at https://www.halliburton.com/en-US/ps/wireline-perforating/wireline-and-perforating/perforating-services/tubing-conveyed-perforating/stimgun-system-technology.html, 2019, 1 page.
Owen Oil Tools, "Kodiak Enhanced Perforating Systems", available online at https://www.corelab.com/owen/stimulationproducts-kodiak, 2019, 5 pages.
Raterman, "Sampling a Stimulated Rock Volume: An Eagle Ford Example", Unconventional Resources Technology Conference, Jul. 2017, 18 pages.
Rocketfrac Services, Ltd., "Ground-Breaking Solid Rocket Propellant Technology (PSI-CLONE)", available online at http://www.rocketfracservices.com/technical/, 2018, 1 page.

* cited by examiner

FRACTURING A WELLBORE WITH ENHANCED TREATMENT FLUID PLACEMENT IN A SUBTERRANEAN FORMATION

CROSS-REFERENCE TO RELATED APPLICATION

This claims the benefit of priority to U.S. Provisional Patent Application No. 62/824,859, filed Mar. 27, 2019, and titled "Methods For Enhancing Treatment Fluid Placement In Subterranean Formations," the contents of which are hereby incorporated by reference as if recited in full herein.

TECHNICAL FIELD

The present disclosure relates generally to fracturing in a wellbore and, more particularly (although not necessarily exclusively), to using propellants for fracturing in a wellbore.

BACKGROUND

Natural fractures in a subterranean formation provide conductive channels through which fluids, such as oil and gas, in the formation may flow to a wellbore for production. The natural fractures, however, can narrow or close and restrict flow. Hydraulic fracturing operations can be performed to create new fractures and maintain the conductive channels of existing fractures. Large amounts of water or other fluids may be pumped at high rates and pressures in hydraulic fracturing operations to provide sufficient energy downhole to form fractures in the formation or enhance existing fractures within the formation. Large amounts of proppant with high injection rates may be used to prop open fractures in the subterranean formation and prevent the fractures from closing. Such operations involve extensive pumping equipment as well as infrastructure to supply the large quantities of water and proppants to the location needed, and may be costly and time-consuming. In some circumstances, the cost and time constraints of hydraulic fracturing operations may be economically impractical.

Chemical treatment fluids can be used with a hydraulic fracturing operations to further promote hydrocarbon fluid production. But, chemical treatment fluids that can etch and erode the formation to aid in fracturing may not be adequately placed during hydraulic fracturing operations. Tight shale formations may prevent chemical treatment fluids from penetrating the formation and restrict placement of the chemical treatment fluid to a limited distance from the wellbore.

DETAILED DESCRIPTION

Certain aspects and examples of the present disclosure relate to performing a fracturing operation in a wellbore using propellants and chemical treatment fluids. Propellants can release energy when ignited and generate pressure that can interact with solids or liquids downhole. Chemical treatment fluids can include selected chemicals to interact downhole, such as acids to etch or erode a rock formation. By using certain examples of the present disclosure, reservoir contact of a chemical treatment fluid can be maximized in very low permeability formations and multiple fractures can be extended from a wellbore.

A fracturing operation can include isolating an interval within a wellbore and perforating the interval to establish fluid communication from wellbore into rock formation. In some examples, fractures in a wellbore may be generated by detonation of a propellant. Examples of a propellant include a solid propellant and an electrically controlled propellant.

The propellant can be used with the chemical treatment fluid in the fracturing operation. For example, a treatment fluid can be introduced into a subterranean formation. A propellant can be positioned in the subterranean formation. The propellant can be detonated to generate one or more fractures in the subterranean formation for receiving at least part of the treatment fluid. In some examples, a pressure gradient generated by detonating the propellant can transport the treatment fluid into the one or more fractures in the subterranean formation. The treatment fluid may be a delayed reactive fluid that includes a chelating agent or an acid. In certain examples, the treatment fluid may enhance the fractures by etching the formation and creating wormholes to open more fractures created by the propellant and increase the porosity of the formation. The increase in the size and quantity of the fractures and overall porosity of the formation can improve fluid conductivity and production of the wellbore.

In some examples, subsequent to detonating the propellant, a fracturing fluid including a micro-proppant or proppant can be injected into the one or more fractures within the subterranean formation at pressures greater than a fracture gradient to extend a length of the fractures and maintain a fluid conductivity of the fractures generated. Without mechanical support from a proppant, fractures within the formation can heal quickly under production. A dramatic drop in production may occur from loss of effective fracture length. In certain examples, detonating the propellant may be immediately followed with pumping a fracturing fluid with proppant into fractures to support the fractures and prevent closure.

The combination of propellant together with the treatment fluid for fracturing can allow for much lower injection rates and smaller volumes of fluid and proppant to be used in wellbore operations. In some cases, a pressure gradient generated by detonating the propellant transports the treatment fluid into the one or more fractures in the subterranean formation. In some cases, the fracturing methods create fracture pulses or dilation waves to help drive the treatment fluid and proppant deeper into the formation.

The treatment fluid can be a reactive fluid that slowly reacts with the formation to induce more fractures throughout the rock through microfractures, natural porosity, and natural fractures. The treatment fluid may leak off from a primary fracture and enhance the effective permeability of a secondary fracture by differential etching or wormhole. In certain examples, the treatment fluid helps to ensure the geometry of the fracture is sufficient for injecting the fracturing fluid with micro-proppant or proppant to support the fracture.

The introducing of treatment fluid and detonation of propellant can be repeated. For example, additional propellant can be detonated after the treatment fluid has been forced into the fractures of the formation to transport or drive the treatment fluid deeper into the formation and extend the fractures. Repeating these steps can increase porosity or fluid conductivity within the subterranean formation.

In some cases, a perforation apparatus with a shape charge can be used to create a perforation in the wellbore. The shape charge can penetrate the wellbore casing and cement to create a tunnel in the rock formation. In some examples, several sections of an interval may be perforated with the perforation apparatus to create multiple openings through the casing within the interval. A pad of treatment fluid may be added to the wellbore through a perforation and may be introduced into the wellbore to be transported or pushed into the fracture upon detonation of the propellant and generation of a pressure gradient high enough to open one or more fractures. By introducing the fluid into the perforation, the fluid may act like a chisel when pushed into the formation by the energy released by the propellant. In this way, the propellant can create pressure and act like hammer to keep pushing the treatment fluid further and further in the rock formation.

Propellant-based fracturing methods can generate fractures in multiple zones and multiple directions along the wellbore. In some cases, the fracture pattern may be multi-radial pattern rather than a bi-wing/planar pattern seen in typical hydraulic fracturing methods. With propellant detonation, the pressure wave may travel in various directions and create multiple fractures in different directions. Without the use of water, multiple fractures may be generated up to 100 feet around the wellbore. In some examples, propellant detonation pulses can generate fracture lengths of a few hundred feet into the formation.

Propellant can be used for fracturing. The propellant can be a solid or a liquid. Fracturing with propellant uses similar principles as traditional hydraulic fracturing: exert pressure to break rock. But, rather than pumping water from the surface to create the pressure, propellant fracturing can generate high pressure gases through the controlled burn of propellant at the target zone.

Propellant-based fracturing according to some examples can provide shorter pressure event duration than other processes, including hydraulic fracturing. The pressure duration event for propellant-based fracturing may be from 500 milliseconds to 30 seconds. In some examples, the pressure duration may be 1 to 20 seconds. The peak pressure for propellant-based fracturing disclosed herein may be from 25,000 psi to 30,000 psi. The duration and intensity of the pressure wave may depend on the amount of isolation achieved in the interval prior to detonation.

Propellant-based fracturing can open fractures with high and low cohesion, and open new fractures. Propellant-based fracturing may generate a fracture pattern of 4-8 radial fractures with fracture lengths of six meters up to thirty meters. Propellant-based fracturing may be used in vertical and horizontal wells for primary stimulation or re-stimulation. Water, beyond the wellbore fluids used in the operation, and proppant may not be required. Small particles may prevent a newly formed fracture from closing and act similar to a proppant. In other cases, the fracture surfaces may be eroded by the temperature and velocity of gases from the detonation that can cause the fracture surfaces to have dissimilar geometry that may be unable to heal back together. In other cases, the fracture may close in a different orientation to create a misalignment that permits fluid access.

In some examples, propellant-based fracturing technology can be combined with a small-scale hydraulic fracturing treatment. Such a small-scale hydraulic fracturing technology may have a lower injection rate and smaller volume of fluid and proppant than other hydraulic fracturing technologies. In some examples, the propellant-based fracturing can generate multiple fractures a distance into the formation around the wellbore. A small-scale hydraulic fracturing treatment can be performed soon after the propellant-based fracturing is applied to extend the length of created fractures and to inject a fracturing fluid with micro-proppant or proppant into the created fractures. For example, a hydraulic fracturing fluid may be injected and positioned within a few seconds from detonation. In other examples, a hydraulic fracturing fluid may be injected and positioned less than five minutes from detonation.

With hydraulic fracturing, the activity or concentration of treatment fluid components, such as surfactant, delayed acid, or chelant, may be spent, diminished, or coated on, as the hydraulic fracturing fluid contacts the formation matrix during permeating through the formation. By utilizing a propellant to introduce a treatment fluid into the formation, the activity or concentration of the treatment fluid may be greater than that available in hydraulic fracturing, which can increase the effectiveness of the treatment fluid to further increase fracture length and porosity of the formation.

In some examples, a treatment fluid may be introduced into a wellbore as a wellbore fluid before detonation and generation of fractures in the formation by propellant-based fracturing. The high pressure generated by propellant detonation may force a treatment fluid present in the wellbore to enter the created fractures and be positioned further into the formation. A small hydraulic fracture may be created to introduce an amount of treatment fluid within the reservoir followed by propellant detonation to drive this fluid much deeper into the reservoir by rapid fracture extension. Certain examples of the present disclosure use a synergistic way of combining chemical means and a mechanical means to enhance introducing and the penetration of treating agent, either chemicals or propping materials.

Technologies of perforating, propellant-based fracturing, small-scale hydraulic fracturing treatment, or chemical treatment fluid, can be combined into a highly efficient reservoir-stimulation process. In hydraulic fracturing, frac sand placed in the created fractures can settle in the bottom side of the fracture, and can allow much of the created fracture height to close back without the desired conductivity. Propellant-based fracturing may involve minimum pumping equipment with much smaller volumes of fracturing fluid and frac sand when compared to other hydraulic fracturing treatments. Suitable proppants can include one or more of natural sand, resin-coated sand, gravel, synthetic organic particles, nylon pellets, high density plastics, composite polymers, polytetrafluoroethylenes, rubbers, resins, ceramics, aluminosilicates, glass, sintered bauxite, quartz, aluminum pellets, nutshells, reinjected drill cuttings, or combinations thereof. Stimulation chemicals can be allowed to have good contact with reservoir without water, friction reducing agent (FR), or frac-sand or other proppant to lower operating costs.

In some examples, propellant-based fracturing technology can be combined with introducing a treatment fluid containing one or more chemical additives into the created fractures. Introducing a treatment fluid can allow one or more chemical additives to interact with the formation surfaces or fluids within the formation through the enhanced fracturing process. Treatment fluids may be positionable in a wellbore to interact in combination with a propellant for fracturing a subterranean formation in wellbore operations.

Illustrative examples are given to introduce the reader to the general subject matter discussed herein and are not intended to limit the scope of the disclosed concepts. The following sections describe various additional features and examples with reference to the drawings in which directional descriptions are used to describe the illustrative aspects, but, like the illustrative aspects, should not be used to limit the present disclosure.

Figure 1:
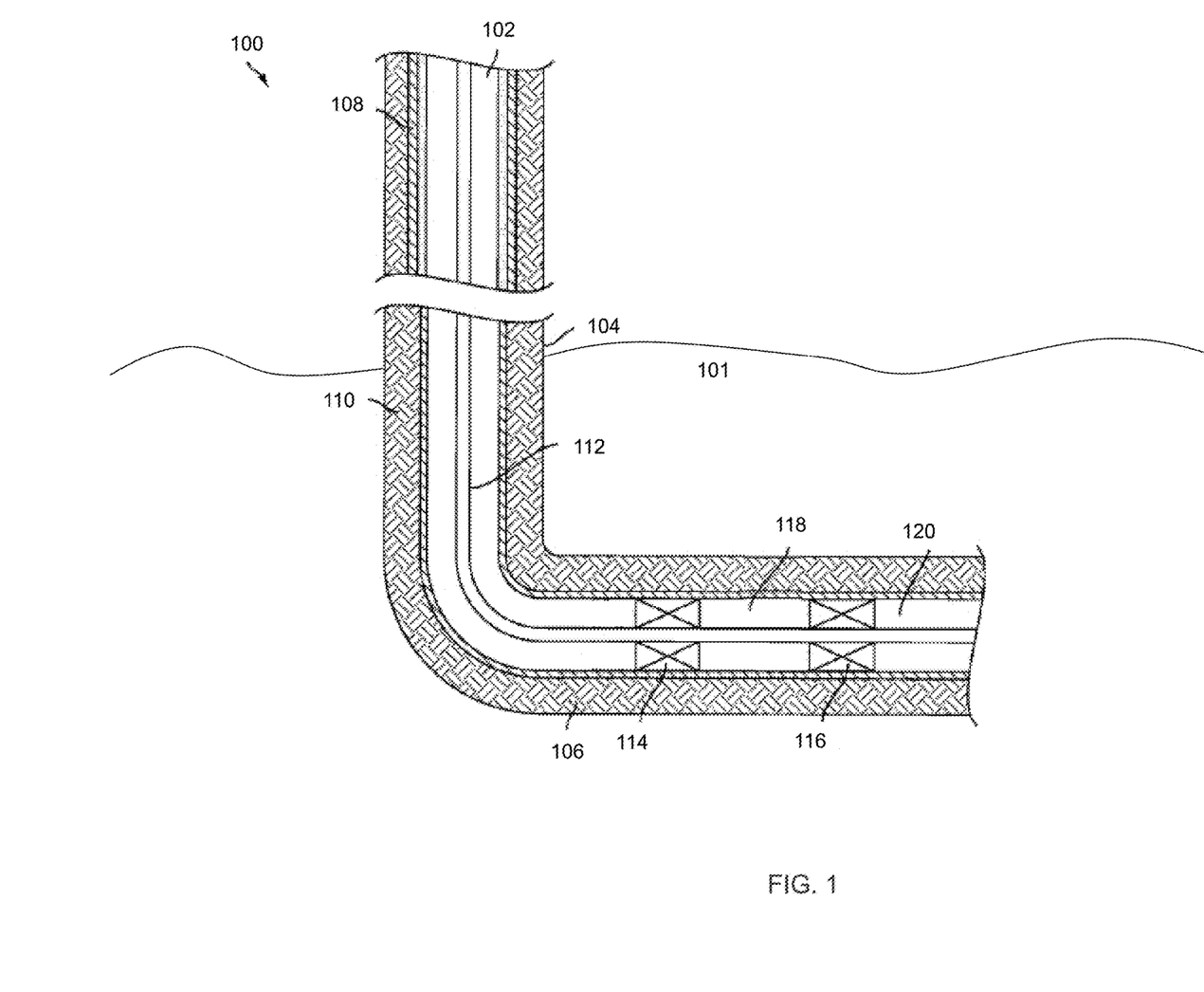
FIG. 1 is an illustrative schematic of a well system having an isolated interval prepared for fracturing operations according to one example of the present disclosure.
Figure 2:
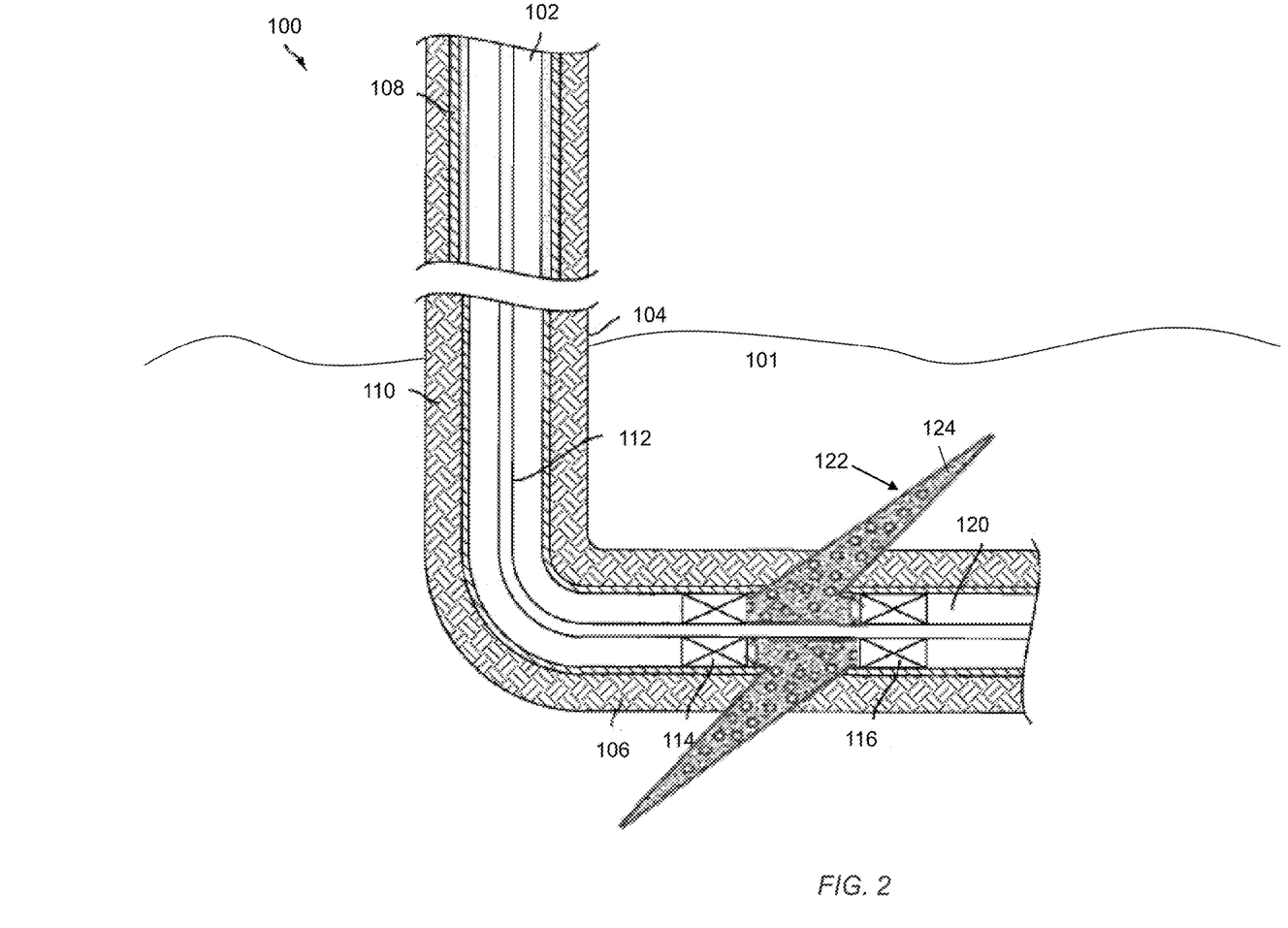
FIG. 2 is an illustrative schematic of a well system with a fracturing operation according to one example of the present disclosure.

FIGS. 1 and 2 depict a well system 100 with packer assemblies according to one example of the present disclosure. The well system 100 includes a bore that is a wellbore 102 extending in a portion of a subterranean zone 101 of interest surrounding the wellbore 102. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110. A tubing string 112 extends from the surface within wellbore 102. The tubing string 112 can provide a conduit for formation fluids to travel from the substantially horizontal section 106 to the surface. Packers 114, 116 are positioned with the tubing string 112 in the horizontal section 106. Other components (not shown), such as production tubular, screens, inflow control devices, can be positioned in the wellbore 102.

An interval of the subterranean formation may be isolated prior to detonating the propellant using one or more of a packer, a plug, sand, a gel, a valve, or other methods known to one skilled in the art. By isolating the interval, energy generated by the detonation may be confine and captured to increase the effectiveness of the pressure wave to fracture the formation. In FIGS. 1 and 2, Packers 114, 116 provide annular seals between the tubing string 112 and the casing string 108 to define interval zones 118 and 120 into which a treatment fluid can be introduced and a propellant can be positioned subsequent to perforation of the casing string 108. As shown in FIG. 2, when the propellant is detonated, one or more fractures 122 may be created in the subterranean zone 101. The treatment fluid 124 may enter the fractures 122.

Although FIGS. 1 and 2 depict packers 114, 116 positioned in the substantially horizontal section 106, packers 114, 116 can be located, additionally or alternatively, in the substantially vertical section 104 to create intervals for fracturing operations.

A treatment fluid may include an acid or chelating agent. In some examples, the treatment fluid may include an acid and a chelating agent. In certain examples, a treatment fluid that includes an acid or chelating agent may be injected into a calcite-laden formation after the generation of fractures with propellant-based fracturing. Fractures created by a propellant or detonation may be extended by introducing an acid or chelating agent soon after the generation of the fractures. In some examples, a treatment fluid that includes an acid or chelating agent may react, etch, or form channels in the formation to extend the created fractures. A treatment fluid may be injected at an injection rate such that the treating pressure of the injection is greater than the fracture gradient after the generation of fractures in the formation by propellant-based fracturing to allow the treatment fluid to extend the created fractures. Water, a brine, a hydraulic fluid, or combinations thereof may be used as a carrier for the treatment fluid.

A treatment fluid may include one or more of a surfactant, a surfactant formulated as a microemulsion, a surfactant formulated as a nanoemulsion, a surfactant formulated as a dispersion, a non-emulsifier, a surface modification agent, a scale inhibitor, a corrosion inhibitor, a paraffin inhibitor, an asphaltene inhibitor, a consolidating composition, a silicate composition, a geopolymer composition, a pour point suppressant composition, a dispersant, a demulsifier, a drag or friction reducer, a viscosity-reducing composition, a viscosity enhancing composition, an oxidizing agent, a reducing agent, a gas hydrate inhibitor, a tracer, a nanoparticle (including for example, $SiO_2$, $TiO_2$, etc.), a hydrogenating agent, a relative or disproportionate permeability modifier, a $H_2S$ inhibitor, a hydrogel, a micromatrix cement, a Portland cement, a sorrel cement, a $CO_2$ generating material, a $CO_2$ sequestering material, or a combination thereof.

In some examples, a treatment fluid includes a hydrolysable in-situ acid generator, a hydrolysable in-situ chelating agent generator, and mixtures thereof. The hydrolysable in-situ acid generator may include at least one hydrolysable acid ester. The hydrolysable acid ester may include at least one member selected from the group consisting of homo- and copolymers of lactic and glycolic acid, homo- and copolymers of vinyl methylsulphonate and vinyl methylphosphonate and dimethylphosphonate, and any combination thereof. In some examples, the hydrolysable in-situ chelating agent generator includes at least one polymer capable of hydrolyzing to an acid and a chelating agent. In some examples, the polymer may include at least one of the following monomers: phosphonate monomers, sulfonate monomers, and combinations thereof. In certain examples, the phosphonate monomers may include at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta (methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof.

A treatment fluid may include a synthetic acid composition that includes urea and hydrogen chloride in a molar ratio of not less than 0.1:1; and a metal iodide or iodate. This synthetic acid composition may further include aminoalkylphosphonic salt or a phosphonic acid derivative. In some examples, a treatment fluid may include a synthetic acid composition comprising an aqueous solution of glycine and hydrogen chloride.

The treatment fluid may include an acid, hydrolysable in-situ acid generator, a chelating agent, a hydrolysable in-situ chelating agent generator, or mixtures thereof. The treatment fluid can include two or more acids, two or more hydrolysable in-situ acid generators, two or more chelating agents, two or more hydrolysable in-situ chelating agent generators, or combinations thereof.

In some examples, the treatment fluid can include a heat generating chemical system. The propellant may be positionable to release energy in multiple planes within the subterranean formation. In some examples, the propellant is a solid or liquid fuel propellant or an electrically controlled propellant.

A treatment fluid may include an energetic fluid, such as a gas and heat generating chemical system that includes a first component and a second component, where the first component can include an ammonium-containing compound and the second component can include a nitrite-containing compound. In some examples, a gas-generating chemical may be selected from the group consisting of an azo-based compound, a hydrazide-based compound, or any combination thereof.

In other examples, a self-initiating, self-reactive energetic treatment fluid includes an aqueous solution that includes: (a) an ammonium salt capable of being exothermally oxidized to produce heat and nitrogen gas; (b) an oxidizing agent capable of oxidizing the ammonium salt; and (c) a free tertiary amine salt or a compound which can react to form a free tertiary amine salt in situ; (d) a low molecular weight carboxylic acid; and (e) a high salinity brine containing divalent ions comprising $Ca^{2+}$ or $Mg^{2+}$. In certain examples, the energetic fluid may include a surfactant.

In some examples, the perforating apparatus may be a set of perforating cluster guns that include clusters whose purpose is to provide ignition means for a larger amount of propellant that is (a) either in the wellbore surrounding the guns, or (b) has been pumped into the formation. In some examples, the liquid propellant may comprise proppant suspended therein. In some examples, the liquid propellant can be gelled or foamed.

In some examples, a delivery apparatus may be a jointed pipe, a wireline, a coiled tubing, or a tubing conveyed perforating assembly to deliver a package or chamber of propellant to the detonation zone of the formation. A liquid propellant may be pumped through a tubular.

Figure 3:
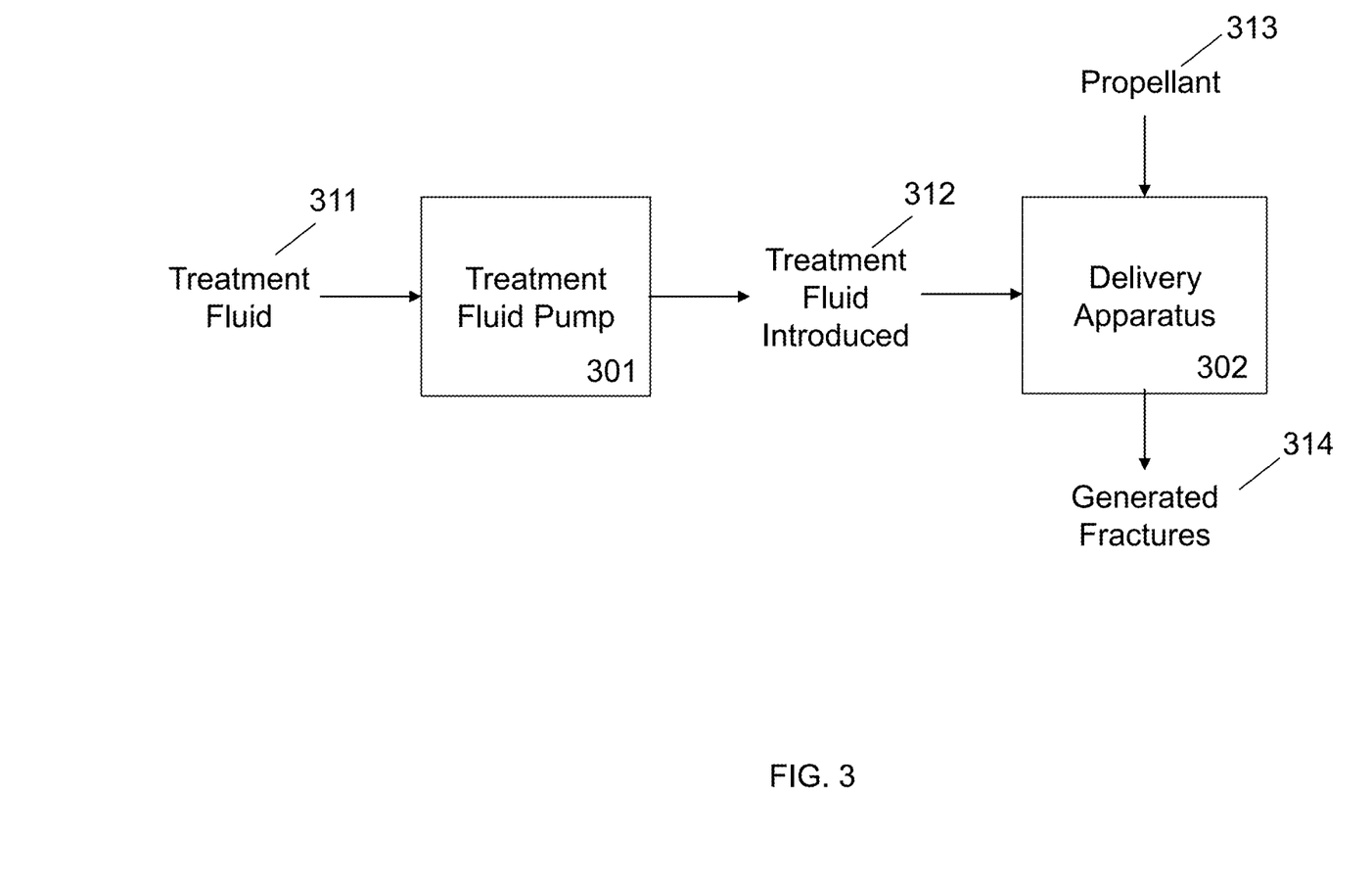
FIG. 3 is a block diagram of a system for fracturing a formation in well system according to one example of the present disclosure.

Various systems can be used for propellant-based fracturing. FIG. 3 shows a system to fracture a formation in a well system according to one example of the present disclosure. One or more treatment fluid pumps 301 may transport a treatment fluid 311 to introduce the treatment fluid into the formation 312. A delivery apparatus 302 may position a propellant 313 to generate fractures in formation 314. The system may also include an isolation device to isolate an interval of the wellbore and confine the energy released to enhance the fracturing process.

Figure 4:
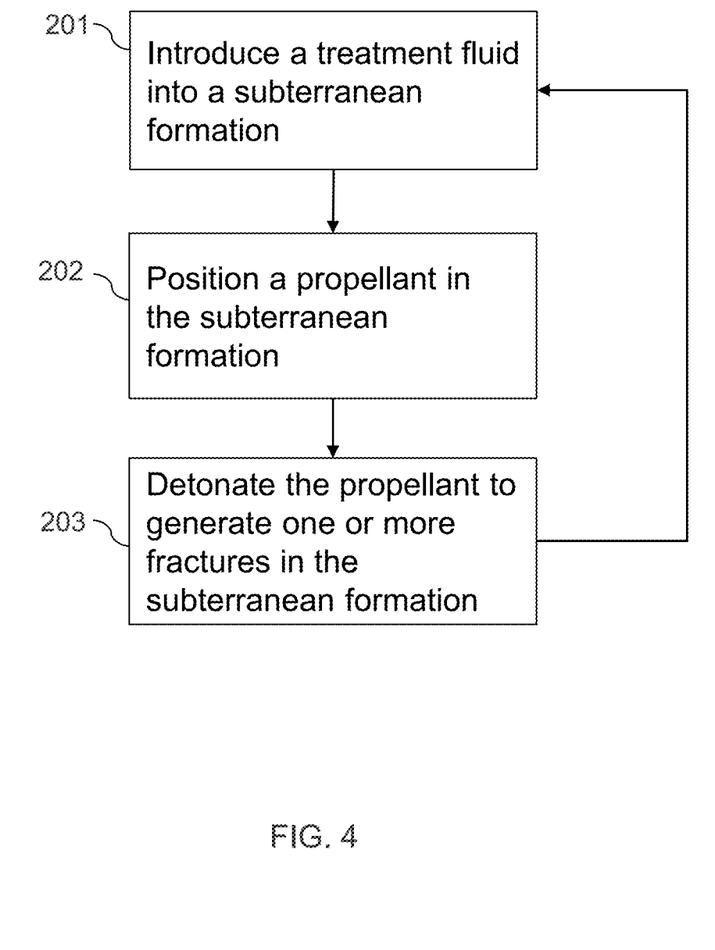
FIG. 4 is a flowchart diagram of a process of fracturing a formation in well system according to one example of the present disclosure.

FIG. 4 is a flowchart diagram of a process of fracturing in a wellbore region according to one example of the present disclosure. In block 201, a treatment fluid is introduced into a subterranean formation, for example, by a pump or other injection apparatus. The treatment fluid includes an acid, a hydrolysable in-situ acid generator, a chelating agent, a hydrolysable in-situ chelating agent generator, or mixtures thereof.

In block 202, a propellant is positioned in the subterranean formation, for example, by using a delivery apparatus, a pump, or other injection apparatus. A propellant carrier can be installed above the delivery apparatus. The propellant may be a solid or liquid fuel propellant or a solid or liquid electrically controlled propellant. In some examples, the order of blocks 201 and 202 may be interchanged. For example, the propellant can be positioned prior to the treatment fluid.

In block 203, the propellant is detonated to generate one or more fractures in the subterranean formation. Detonation may occur through the use of one or more detonation cords, electrical ignition or activation, or combinations thereof. A pressure gradient generated by detonating the propellant transports the treatment fluid into the one or more fractures in the subterranean formation. Extreme overbalanced pressure with heat and gas generated by the detonation can cause shear and tensile failures in the formation to create additional fractures and microfractures. Micro-proppant can be injected in the microfractures.

An interval of the wellbore can be isolated and subsequently perforated by igniting perf gun shaped charges under extreme overbalanced pressure. A fracturing fluid can be injected to carry proppant and micro-proppant into a perforated interval to extend one or more fractures into the reservoir through the exposed perforations.

In some examples, processes may include generating hydrofluoric acid in-situ (i.e., in the formation) with a treatment fluid having a base fluid, an acid, and a fluoride releasing agent selected from the group consisting of an amine monofluorophosphate, a bisamine monofluorophosphate, any derivative thereof, and any combination thereof, where the acid and the fluoride releasing agent react to generate hydrofluoric acid over time in the subterranean formation so as to create or enhance at least one microfracture therein.

For some examples, steam can be introduced into the one or more generated fractures subsequent to detonating the propellant. Introducing steam into the one or more generated fractures at pressures greater than a fracture gradient may extend a length of the one or more fractures generated by propellant fracturing. The injection of steam may be followed by an injection of air and ammonia gas.

In some examples, a method includes injection of a heat-generated composition comprising alkali metal silicides into a formation via the created fractures to generate hydrogen gas, heat, and alkali metal silicate solution in situ upon contact with water. The generated heat can help to increase formation temperature, thereby decreasing viscosity of crude oil present in the formation adjacent to the treated area. The resulting alkaline silicate solution can saponify acidic crude components to form surfactants that emulsify the crude to improve mobility toward the production wellbore. In some examples, a fracturing fluid may be a non-aqueous based fluid, such as foamed $N_2$, foamed $CO_2$, liquid $CO_2$, liquid methane, liquefied natural gas (LNG), or liquefied petroleum gas (LPG).

In certain examples, a foamed fracturing fluid may be prepared with a natural gas, an aqueous fluid, a surfactant, and an optional nanoparticle. A fracturing fluid or a treatment fluid may be foamed in-situ (i.e., foam may be generated inside the created fractures after the fluid passes through the perforations).

Forming fractures in the formation with propellant-based fracturing systems can allow for small-scale hydraulic fracturing treatments to be applied at low injection rates. In some examples, the volume of fracturing fluid and the horsepower required for propellant-based fracturing operations, and associated costs, can be significantly lower than other methods.

And, in some examples, a fracturing fluid including a micro-proppant or proppant can be placed in the one or more fractures within the subterranean formation. Injecting the fracturing fluid including the proppant may be at pressures greater than a fracture gradient to extend a length of the fractures and maintain a fluid conductivity of the fractures generated. The proppant can be transported further into the induced fractures by the energy released by the propellant detonation. The proppant can include one or more of natural sand, resin-coated sand, gravel, synthetic organic particles, nylon pellets, high density plastics, composite polymers, polytetrafluoroethylenes, rubbers, resins, ceramics, aluminosilicates, glass, sintered bauxite, quartz, aluminum pellets, nutshells, or combinations thereof. In certain examples, blocks 201-203 may be repeated to extend a fracture length within the formation.

In some examples, a small volume of fracturing fluid may be injected into the formation at injection rate with treating pressure greater than the fracture gradient soon after the detonation and generation of fractures in the formation by propellant-based fracturing to extend the fracture length and inject proppant into the created fractures.

A small volume of fracturing fluid containing a micro-proppant may be injected into the formation at injection rate with treating pressure greater than the fracture gradient soon after the detonation and generation of fractures in the formation by propellant-based fracturing to extend the fracture length and to place micro-proppant in the created microfractures.

In certain examples, a treatment fluid may be introduced into the wellbore as a wellbore fluid before the detonation and generation of fractures in the formation by proppant-based fracturing. The high pressure generated by propellant detonation can help force the treatment fluid existing in the wellbore to enter the created fractures and be placed into the formation. A small volume of fracturing fluid can then be injected into the formation at injection rate with treating pressure greater than the fracture gradient to extend the fracture length and to inject micro-proppant or proppant in the created fractures.

The propellant may be a solid or a liquid conventional controlled propellant that can be ignited with pyrotechnics, igniters, or detonators. In some examples, the liquid electrically controlled propellant may be an electric liquid monopropellant. The propellant may be positioned in a wellbore surrounding the perf gun charges. In some examples, the liquid propellant may be injected and positioned in the wellbore and the formation after the first ignition of perf gun shaped charges. In other examples, the micro-proppant suspended in the wellbore fluid may be a lightweight particulate.

In some examples, the propellant and perforation shaped charges may be placed together in a device, where the propellant is contained in a container placed above the shaped charges. In certain examples, the device can be run into well to target interval with jointed pipe, wireline, coiled tubing, or tubing conveyed perforating assembly. The perforating event may result from detonating shaped charges to generate perforations occurs independent of the detonation of propellant.

In certain examples, liquid propellant may be injected into the device at any time or at time step after the perforation event to repeat the detonation process. Two or more of these devices can be installed and activated for various target intervals in the wellbore. In some examples, fracturing fluid containing proppant may be injected continuously even during detonation of propellant.

In some aspects, methods, systems, and treatment fluids for propellant-based fracturing are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a method comprising: introducing a treatment fluid into a subterranean formation, the treatment fluid comprising: an acid, a hydrolysable in-situ acid generator, a chelating agent, a hydrolysable in-situ chelating agent generator, or mixtures thereof; positioning a propellant in the subterranean formation; and detonating the propellant to generate one or more fractures in the subterranean formation for receiving at least part of the treatment fluid.

Example 2 is the method of example(s) 1, further comprising subsequent to detonating the propellant, injecting a fracturing fluid comprising a micro-proppant or a proppant in the one or more fractures within the subterranean formation at pressures greater than a fracture gradient to extend a length of the fractures and maintain a fluid conductivity of the fractures generated.

Example 3 is the method of example(s) 2, wherein the micro-proppant or proppant comprises one or more of natural sand, resin-coated sand, gravel, synthetic organic particles, nylon pellets, high density plastics, composite polymers, polytetrafluoroethylenes, rubbers, resins, ceramics, aluminosilicates, glass, sintered bauxite, quartz, aluminum pellets, nutshells, reinjected drill cuttings, or combinations thereof.

Example 4 is the method of example(s) 1-3, further comprising: subsequent to performing the steps of claim 1, extending the one or more fractures in the subterranean formation by detonating additional propellant, at least part of the treatment fluid being introduced into the one or more fractures that are extended in the subterranean formation; and repeating the step of detonating additional propellant and introducing the treatment fluid into the one or more fractures to increase porosity or fluid conductivity within the subterranean formation.

Example 5 is the method of example(s) 1-4, wherein the propellant is a solid or liquid fuel propellant or an electrically controlled propellant.

Example 6 is the method of example(s) 1-5, wherein a pressure gradient generated by detonating the propellant transports the treatment fluid into the one or more fractures in the subterranean formation.

Example 7 is the method of example(s) 1-6, wherein the treatment fluid comprises the hydrolysable in-situ chelating agent generator, the hydrolysable in-situ chelating agent generator comprising phosphonate monomers, sulfonate monomers, or combinations thereof.

Example 8 is the method of example(s) 1-7, wherein the treatment fluid comprises the hydrolysable in-situ acid generator, the hydrolysable in-situ acid generator comprising at least one hydrolysable acid ester, the hydrolysable acid ester comprising homopolymers and copolymers of lactic acid, homopolymers and copolymers of glycolic acid, homopolymers and copolymers of vinyl methylsulphonate, homopolymers and copolymers of vinyl methylphosphonate, and homopolymers and copolymers of dimethylphosphonate, or combinations thereof.

Example 9 is the method of example(s) 1-8, wherein the treatment fluid comprises: an ammonium salt; an oxidizing agent; a free tertiary amine salt or a compound; a carboxylic acid; and a brine comprising at least one of calcium or magnesium divalent ions.

Example 10 is the method of example(s) 1-9, wherein the treatment fluid further comprises one or more of a surfactant, a surface modification agent, a scale inhibitor, a corrosion inhibitor, a paraffin inhibitor, an asphaltene inhibitor, a pour point suppressant composition, a dispersant, a demulsifier, a drag reducer, a viscosity-reducing composition, an oxidizer composition, a gas hydrate inhibitor, a tracer, or a nanoparticle.

Example 11 is the method of example(s) 1-10, further comprising, subsequent to detonating the propellant, introducing steam into the one or more fractures at pressures greater than a fracture gradient to extend a length of the one or more fractures.

Example 12 is a method comprising: introducing a treatment fluid into a subterranean formation, the treatment fluid comprising: an acid, a hydrolysable in-situ acid generator, a chelating agent, a hydrolysable in-situ chelating agent generator, or mixtures thereof; positioning a propellant in the subterranean formation; detonating the propellant to generate one or more fractures in the subterranean formation; and injecting a fracturing fluid comprising a micro-proppant or a proppant in the one or more fractures within the subterranean formation.

Example 13 is the method of example(s) 12, wherein a pressure gradient generated by detonating the propellant transports the treatment fluid into the one or more fractures in the subterranean formation.

Example 14 is the method of examples(s) 12 or 13, wherein the fracturing fluid extends a length of the fractures and maintains a fluid conductivity of the fractures generated.

Example 15 is the method of example(s) 12-14, wherein the propellant is a solid or liquid fuel propellant or an electrically controlled propellant.

Example 16 is the method of examples(s) 12-15, wherein the micro-proppant or proppant comprises one or more of natural sand, resin-coated sand, gravel, synthetic organic particles, nylon pellets, high density plastics, composite polymers, polytetrafluoroethylenes, rubbers, resins, ceramics, aluminosilicates, glass, sintered bauxite, quartz, aluminum pellets, nutshells, reinjected drill cuttings, or combinations thereof.

Example 17 is a system comprising: one or more pumps to introduce a treatment fluid into a wellbore and a subterranean formation, the treatment fluid comprising: an acid, a hydrolysable in-situ acid generator, a chelating agent, a hydrolysable in-situ chelating agent generator, or mixtures thereof; and a delivery apparatus to position propellant into the subterranean formation.

Example 18 is the system of example(s) 17, wherein the delivery apparatus is a tubular.

Example 19 is the system of example(s) 17 or 18, wherein the propellant is positionable to release energy in multiple planes within the subterranean formation.

Example 20 is the system of example(s) 17-19, wherein the propellant is a solid or liquid fuel propellant or an electrically controlled propellant.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    isolating an interval of a wellbore in a subterranean formation;
    perforating the interval to establish fluid communication from the wellbore into the subterranean formation;
    positioning a propellant in the interval of the wellbore in the subterranean formation, the propellant comprising an electronically controlled propellant;
    introducing a treatment fluid into the interval of the wellbore with the propellant, the treatment fluid comprising: an acid, a hydrolysable in-situ acid generator, a chelating agent, a hydrolysable in-situ chelating agent generator, or mixtures thereof;
    detonating the propellant to generate a plurality of propellant detonation pulses to cause one or more fractures in the subterranean formation for receiving at least part of the treatment fluid, and wherein a plurality of pressure gradients generated by detonating the propellant transports the treatment fluid into the one or more fractures in the subterranean formation; and
    injecting a heat-generating composition into the one or more fractures to increase a temperature in the subterranean formation.

2. The method of claim 1, further comprising subsequent to detonating the propellant, injecting a fracturing fluid comprising a micro-proppant or a proppant in the one or more fractures within the subterranean formation to extend a length of the fractures and maintain a fluid conductivity of the fractures generated.

3. The method claim 2, wherein the treatment fluid is a delayed reactive fluid that etches or erodes the subterranean formation to modify a geometry of the one or more fractures to be sufficient for injecting the micro-proppant or proppant.

4. The method of claim 1, wherein introducing the treatment fluid occurs simultaneously with detonating the propellant.

5. The method of claim 1, wherein the heat-generating composition comprises an alkali metal silicide, and wherein the alkali metal silicide generates hydrogen gas, heat, and alkali metal silicate solution in-situ in the one or more fractures upon contact with water in the subterranean formation.

6. The method of claim 1, wherein a length of at least one of the one or more fractures is extended by 100 feet or more by detonating the propellant.

7. The method of claim 1, wherein the treatment fluid comprises the hydrolysable in-situ chelating agent generator, the hydrolysable in-situ chelating agent generator comprising phosphonate monomers, sultanate monomers, or combinations thereof.

8. The method of claim 1, wherein the treatment fluid comprises the hydrolysable in-situ acid generator, the hydrolysable in-situ acid generator comprising at least one hydrolysable acid ester, the hydrolysable acid ester comprising homopolymers and copolymers of lactic acid, homopolymers and copolymers of glycolic acid, homopolymers and copolymers of vinyl methylsulphonate, homopolymers and copolymers of vinyl methylphosphonate, and homopolymers and copolymers of dimethylphosphonate, or combinations thereof.

9. The method of claim 1, wherein the treatment fluid further comprises:
    an ammonium salt;
    an oxidizing agent; and
    a brine comprising at least one of calcium or magnesium divalent ions,
    wherein the hydrolysable in-situ chelating agent generator comprises a free tertiary amine salt or a compound, and
    wherein the acid comprises a carboxylic acid.

10. The method of claim 1, wherein the treatment fluid further comprises one or more of a surfactant, a surface modification agent, a scale inhibitor, a corrosion inhibitor, a paraffin inhibitor, an asphaltene inhibitor, a pour point suppressant composition, a dispersant, a demulsifier, a drag reducer, a viscosity-reducing composition, an oxidizer composition, a gas hydrate inhibitor, a tracer, or a nanoparticle.

11. The method of claim 1, further comprising:
subsequent to detonating the propellant, introducing steam into the one or more fractures at pressures greater than a fracture gradient to extend a length of the one or more fractures; and
subsequent to introducing steam, introducing air or ammonia gas into the one or more fractures.

12. A method comprising:
isolating an interval of a wellbore in a subterranean formation;
perforating the interval to establish fluid communication from the wellbore into the subterranean formation;
positioning a propellant in the interval of the wellbore in the subterranean formation, the propellant comprising an electronically controlled propellant; and
introducing a treatment fluid into the interval of the wellbore the interval of the wellbore with the propellant, the treatment fluid comprising: an acid, a hydrolysable in-situ acid generator, a chelating agent, a hydrolysable in-situ chelating agent generator, or mixtures thereof;
detonating the propellant to generate propellant detonation pulses to cause one or more fractures in the subterranean formation, and wherein a plurality of pressure gradients generated by detonating the propellant transports the treatment fluid into the one or more fractures in the subterranean formation;
injecting a heat-generating composition into the one or more fractures to increase a temperature in the subterranean formation; and
injecting a fracturing fluid comprising a micro-proppant or a proppant in the one or more fractures within the subterranean formation.

13. The method of claim 12, wherein a length of at least one of the one or more fractures is extended by 100 feet or more by detonating the propellant.

14. The method of claim 12, wherein the fracturing fluid extends a length of the fractures and maintains a fluid conductivity of the fractures generated.

15. The method of claim 12, wherein the heat-generating composition comprises an alkali metal silicide, and wherein the alkali metal silicide generates hydrogen gas, heat, and alkali metal silicate solution in-situ in the one or more fractures upon contact with water.

16. The method of claim 12, wherein the treatment fluid is a delayed reactive fluid that etches or erodes the subterranean formation to modify a geometry of the one or more fractures to be sufficient for injecting the micro-proppant or proppant.

17. A system comprising:
a first isolation device, positionable downhole in a wellbore in a subterranean formation at a first measured depth;
a second isolation device, positionable downhole in the wellbore at a second measured depth to define an isolated interval between the first isolation device and the second isolation device;
a delivery apparatus to position propellant into the isolated interval; and
one or more pumps to introduce a treatment fluid into the isolated interval with the propellant and the subterranean formation, the treatment fluid comprising: an acid, a hydrolysable in-situ acid generator, a chelating agent, a hydrolysable in-situ chelating agent generator, or mixtures thereof,
wherein the propellant comprises an electronically controlled propellant configured to generate a plurality of propellant detonation pulses, generating one or more fractures for receiving the treatment fluid and generating a plurality of pressure gradients that transports the treatment fluid into the one or more fractures, and wherein the one or more pumps are further arranged to inject a heat-generating composition into the one or more fractures to increase a temperature in the subterranean formation.

18. The system of claim 17, wherein the heat-generating composition comprises an alkali metal silicide, and wherein the alkali metal silicide generates hydrogen gas, heat, and alkali metal silicate solution in-situ in the one or more fractures upon contact with water in the subterranean formation.

19. The system of claim 17, wherein the propellant is positionable to release energy in multiple planes within the subterranean formation.

20. The system of claim 17, wherein the propellant is a solid or liquid fuel propellant.

* * * * *